United States Patent
Sun

(10) Patent No.: US 7,567,038 B2
(45) Date of Patent: Jul. 28, 2009

(54) LIGHT AND POWER COGENERATION LIGHT DEVICE

(75) Inventor: Tsung-Ting Sun, Chung-Ho (TW)

(73) Assignee: Edison Opto Corporation, Taipei Hsien (TW)

( * ) Notice: Subject to any disclaimer, the term of this patent is extended or adjusted under 35 U.S.C. 154(b) by 63 days.

(21) Appl. No.: 11/773,536

(22) Filed: Jul. 5, 2007

(65) Prior Publication Data

US 2009/0009988 A1 Jan. 8, 2009

(51) Int. Cl.
*G09G 3/10* (2006.01)
*F21L 4/00* (2006.01)
(52) U.S. Cl. .................... 315/169.3; 362/183
(58) Field of Classification Search ............... 362/183, 362/184, 185, 249, 339, 800; 315/169.1, 315/169.3
See application file for complete search history.

(56) References Cited

U.S. PATENT DOCUMENTS 5,237,490 A * 8/1993 Ferng ..................... 362/183

* cited by examiner

*Primary Examiner*—John A Ward
(74) *Attorney, Agent, or Firm*—Rosenberg, Klein & Lee

(57) ABSTRACT

A light device adapted to light and power cogeneration projects at least one illumination light beam and divergent light beam by a specified power supplied from an external power source. The light device comprises an optical-to-electrical energy transformation unit and a power storage unit. The optical-to-electrical energy transformation unit comprises a light-concentration assembly and an optical-to-electrical energy transformation interface for concentrating the divergent light beam to at least one concentrated light beam and sensing the concentrated light beam, so as to generate an inductive power transmitting to the power storage unit, where collects the inductive power to store an emergent power. When the external power source interrupts supplying the specified power, the power storage unit discharges the emergent power to drive the lighting assembly to go on projecting the illumination light beam and the divergent light beam.

8 Claims, 4 Drawing Sheets

LIGHT AND POWER COGENERATION LIGHT DEVICE

FIELD OF THE INVENTION

The present invention relates to a light device, and more particularly to a light device capable of performing light and power cogeneration.

BACKGROUND OF THE INVENTION

In daily life, for exactly identifying environment and directions in the dark, illumination devices have already been sorts of indispensable tools. Due to that the cost of energy sources usually keeps in high, and the power used in illumination in a certain proportion of overall power in global for a long time, there are many engineers continuously doing their efforts to research and develop proper illumination devices to reduce the power consumption cost for illumination.

Additionally, with respect to the function of the illumination device, the most illumination devices still needs to connect to an external power, such as public power supplying system, and then provides illumination to an external environment. However, once the external power source interrupts supplying a specified power to the illumination device, more particular when a large electric power cut occurs after a natural disaster, the most illumination device cannot go on providing emergent illumination to the external environment.

For saving the cost of power used for illumination and providing the function of emergent illumination, there are many light devices being designed and widely used for most of people. Following up, two representative prior embodiments are cited to do more detail description.

Please refer to FIG. 1, which is a functional block diagram illustrating a conventional light device being capable of being charged by a solar energy system. As shown in FIG. 1, a light device comprises a chargeable power source 11, a circuit interface 12 and a lighting element 13. The circuit interface 12 is respectively connected to the chargeable power source 11 and the lighting element 13. The chargeable power source 11 is applied to discharge a specified power to the lighting element 13, so as to make the lighting element 13 project an illumination light beam.

When the power of the chargeable power source 11 is insufficient to drive the lighting element 13 to project an illumination light beam to the external environment, it is able to electrically connect the chargeable power source 11 to the solar energy system 2, so as to charge the chargeable power source 11. After completing the charging operation to the chargeable power source 11, the chargeable power source 11 can discharge the specified power to the lighting element 13, which can go on projecting the illumination light beam to the external environment.

People skilled in related arts can easily realize that, comparing with the petrochemistry or nuclear energy power generation means, the solar energy can be gained everywhere to save the energy cost. However, the supplying of solar energy is not very stable, so that it is unable to ensure that the power stored in the solar energy system can stably supply to the chargeable power source 11, and it is further unable to ensure that the lighting element 13 can provide stable illumination to the external environment.

Please refer to FIG. 2, which is a functional block diagram illustrating that another light device can provide emergent illumination. As shown in FIG. 2, a light device 1a comprises a circuit interface 12a, the chargeable power source 11 and the lighting element 13. The circuit interface 12a comprises a power supplying circuit 121a, a switch circuit 122a, a power distribution circuit 123a and a detecting circuit 124a. The power supplying circuit 121a is electrically connected with the power distribution circuit 123a and the lighting element 13, and the switch circuit 122a is electrically connected to the chargeable power source 11 and the detecting circuit 124a.

When the light device 1a is connected to an external power source 3, the power distribution circuit 124a can detect whether the external power source 3 sends a specified power to the power distribution circuit 123a. If the detecting circuit detects that the external power source 3 sends the specified power to the power distribution circuit 123a, the detecting circuit 124a can send a normal switch signal S1 to the switch circuit 122a, so that the chargeable power source 11 can electrically connect to the power distributed circuit 123a via the switch circuit 122a.

At this moment, the specified power supplied from the external power source 3 can be sent to the power distribution circuit 123a, where can divide the specified power into a first distributed power and a second distributed power according to a preset distribution proportion. The first distributed power is sent to the lighting element 13 via the power supplying circuit 121a, so as to drive the lighting element 13 to project the illumination light beam. The second distributed power is sent to the chargeable power source 11 to charge the chargeable power source 11, where stored with an emergent power.

On the contrary, if the detecting circuit 124a detects the external power source 3 interrupting sending the specified power to the power distribution circuit 123a, the detecting circuit 124a can send an emergent switch signal S2 to the switch circuit 122a to connect the chargeable power source 11 with the power supplying circuit 121a via the switch circuit 122a. At this moment, the emergent power stored within the chargeable power source 11 can be sent to the lighting element 13 via the switch circuit 122a and the power supplying circuit 121a, so as to drive the lighting element 13 to project the illumination light beam.

Except for of the functional block diagram as shown in FIG. 2, in some circuit designs, the detecting circuit 124a is further electrically connected to the chargeable power source, so as to detect whether the emergent power stored within the chargeable power source reaches to a nominal power. When the emergent power reaches to the nominal power, the detecting circuit 124a can send a distribution signal to the switch circuit and the power distribution circuit 123a, so as to interrupt the chargeable power source 11 being electrically connected to the power distribution circuit 123a, and adjust the preset distribution proportion.

People skilled in related arts can easily realize that, in the above technology, a circuit design for a light device is disclosed, wherein when the external power source 3 interrupts sending the specified power, it is able to drive the lighting element 13 to provide emergent illumination via the emergent power supplied from the chargeable power source 11.

However, in the above technology, for making the chargeable power source be stored with sufficient emergent power source, the power distribution circuit has to divide the specified power into the first distributed power and the second distributed power according to the preset distribution proportion, and then sends the second distributed power to the chargeable power source 11. Thus, it must reduce the utilization ratio of the power used to light, wherein the utilization ratio of the power is related to the value that divides the first distributed power by the specified power.

SUMMARY OF THE INVENTION

The problems intend being solved in the present invention and the objects of the present invention are described as follows:

Although above two prior arts can solve some problems, there are still two existed problems difficult to be solved. The first problem is that it is unable to ensure that the lighting element can provide stable illumination, and the second problem is that the utilization ratio of the power used to light is reduced.

Thus, the primary object of the present invention provides a light device capable of performing light and power cogeneration. The light device drive an optical-to-electrical energy transformation interface to generate an inductive power by taking advantage of the divergent light beams those cannot provide illumination to the external environment, and then collect the inductive power to store an emergent power. When the external power source interrupts supplying the specified power to the light device, it is able to drive the light device to go on providing illumination to the external environment by the emergent power.

The second object of the present invention provides a light device capable of performing light and power cogeneration. The light device is arranged with a light-concentration assembly to concentrate the divergent light beams those cannot provide illumination to the external environment, so as to drive a optical-to-electrical energy transformation interface to generate an inductive power with higher intensity.

The third object of the present invention provides a light device capable of performing light and power cogeneration, so as to store an emergent power. Therefore, a specified power supplied from an external power can be entirely used to light without being partially distributed to store the emergent power.

Means of the present invention for solving problems:

Means of the present invention for solving the problems as mentioned above provides a light device capable of performing light and power cogeneration, which can project at least one illumination light beam and at least one divergent beam by a specified power supplied from an external power source. The light device comprises an optical-to-electrical energy transformation unit and a power storage unit. The optical-to-electrical energy transformation unit comprises a light-concentration assembly and an optical-to-electrical energy transformation interface for concentrating the divergent light beam to at least one concentrated light beam and sensing the concentrated light beam, so as to generate an inductive power transmitting to the power storage unit, where collects the inductive power to store an emergent power. When the external power source interrupts supplying the specified power, the power storage unit discharges the emergent power to drive the lighting assembly to go on projecting the illumination light beam and the divergent light beam.

Effects of the present invention with respect to prior arts:

From above description, comparing with the conventional light device capable of being charged by the solar energy system in the prior art, the light device of the present invention can store the emergent power by using the divergent light beam that cannot provide illumination to the external environment. Thus, it can ensure that the light device still can provide stable illumination to the external environment, without charging any power supplied from the solar energy system, whenever the external power source cannot normally supplied the specified power.

With comparison between the conventional light device capable of providing emergent illumination in the prior art and the light device of the present invention, the light device of the present invention stores the emergent power by using the divergent light beam that cannot provide illumination to the external environment, so that the specified power can be entirely supplied to the lighting assembly. Therefore, it is able to raise the utilization ratio of the power used to light.

Additionally, in the conventional light device, the divergent light beam, which cannot provide illumination to the external environment, may be either lost by diverging to the external environment or transformed to heat energy absorbed by the light device to increase the surface temperature. However, in the present invention, it is able to use the divergent light beam to generate the inductive power, so as to raise the raise the utilization ratio of the light energy and reduce the surface temperature of the light device.

The devices, characteristics, and the preferred embodiment of this invention are described with relative figures as follows.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Due to that the light and power cogeneration means as provided in accordance with the present invention can be widely applied to many kinds of light devices, the combined applications are too numerous to be enumerated and described, so that only a preferred embodiment is disclosed as follows for representation.

Figure 1:
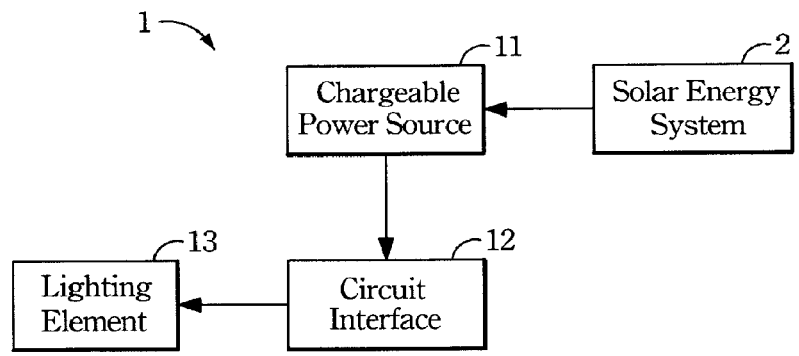
FIG. 1 is a functional block diagram illustrating a conventional light device being capable of being charged by a solar energy system.
Figure 2:
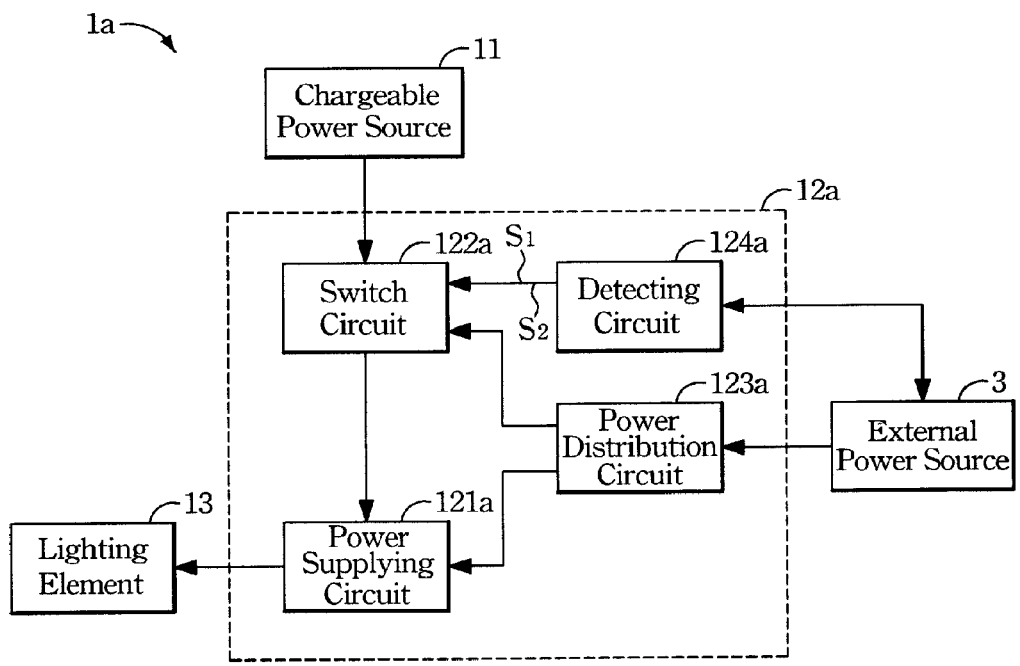
FIG. 2 is a functional block diagram illustrating that another light device can provide emergent illumination.
Figure 3:
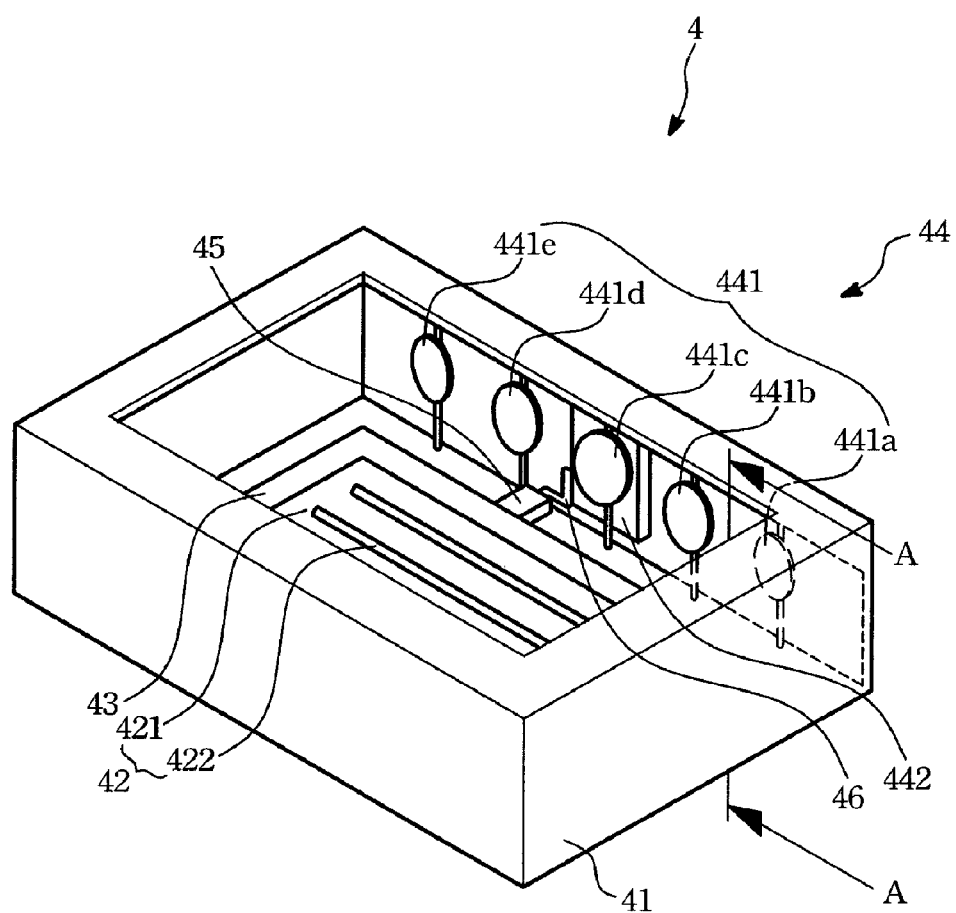
FIG. 3 is a perspective view illustrating a preferred embodiment of the present invention.
Figure 4:
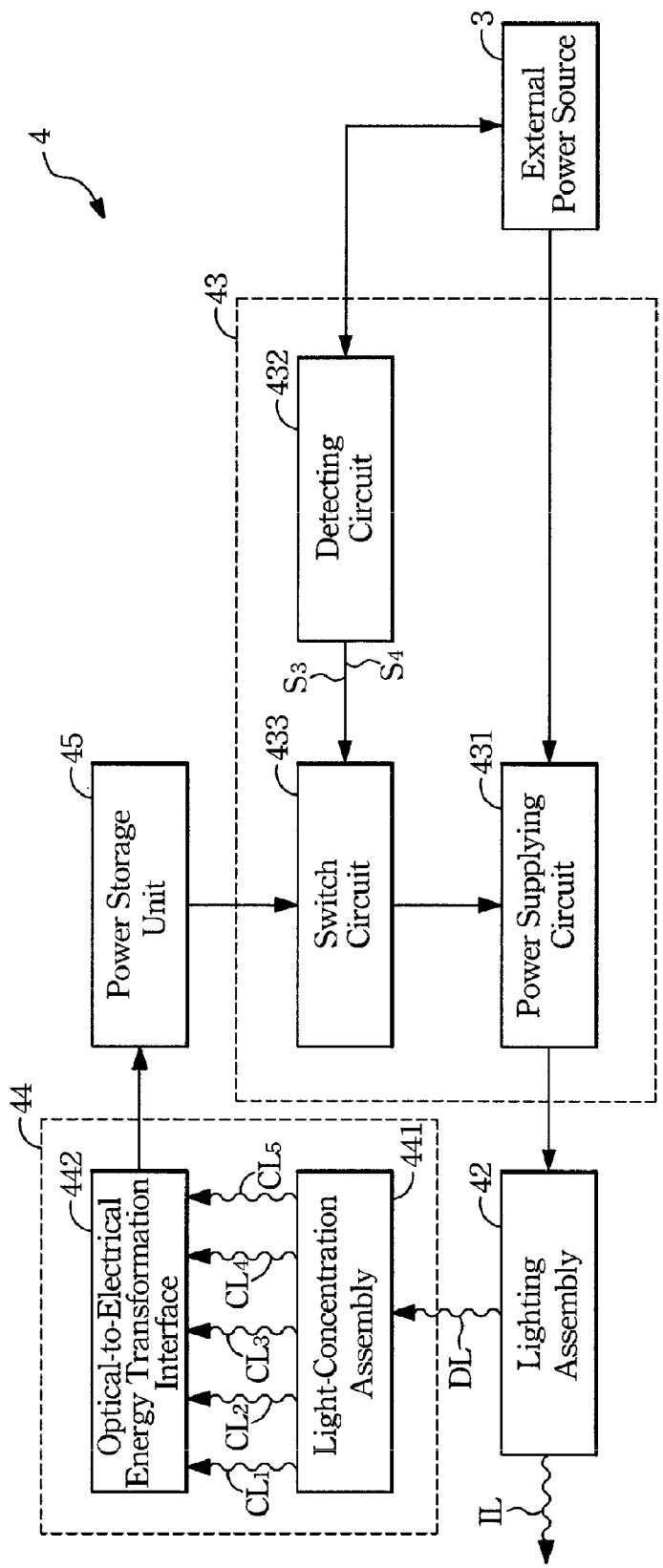
FIG. 4 is a functional block diagram illustrating the preferred embodiment of the present invention.
Figure 5:
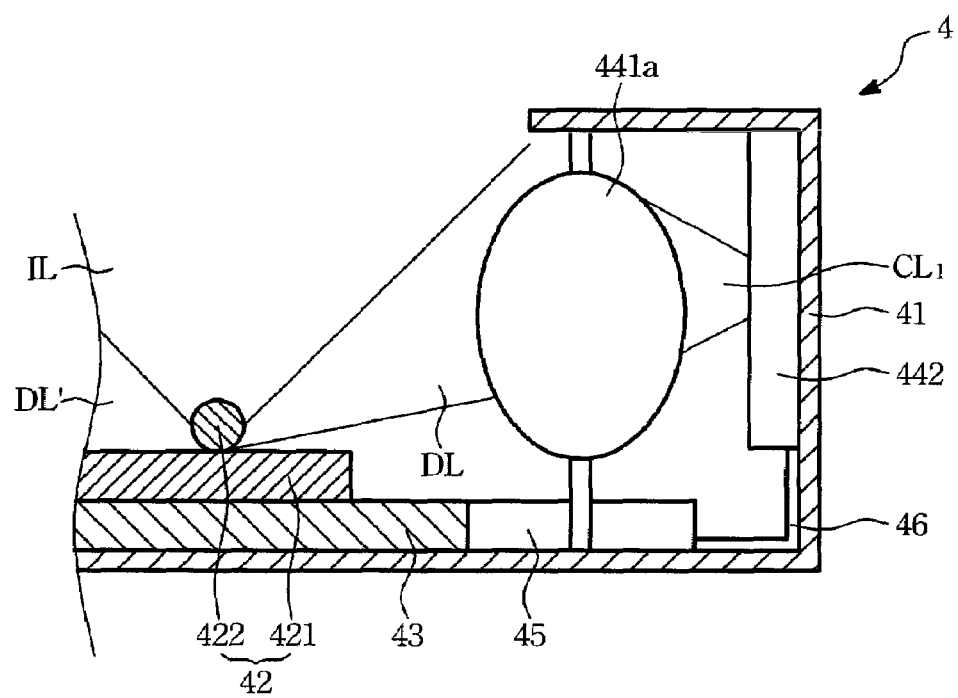
FIG. 5 is a partial section view along the A-A direction of FIG. 3.
Figure 6:
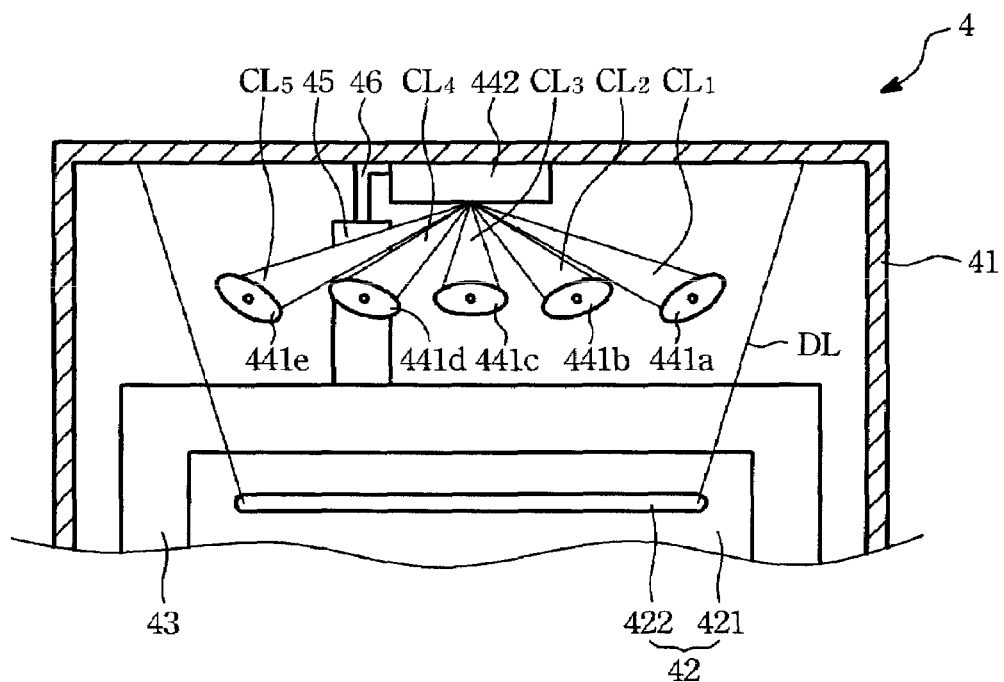
FIG. 6 illustrates that the divergent light beams can be concentrated in the preferred embodiment of the present invention.

Please refer to FIG. 3 to FIG. 6, wherein FIG. 3 is a perspective view illustrating a preferred embodiment of the present invention, FIG. 4 is a functional block diagram illustrating the preferred embodiment of the present invention, FIG. 5 is a partial section view along the A-A direction of FIG. 3, and FIG. 6 illustrates that the divergent light beams can be concentrated in the preferred embodiment of the present invention. As shown in the figures, a light device 4 comprises a light box 41, a lighting assembly 42, a circuit interface 43, an optical-to-electrical energy transformation unit 44, a power storage unit 45 and a conductive wire 46. The lighting assembly 42 comprises a base plate 421 and a plurality of light emitting diodes (LEDs) 422, wherein the base plate 421 is deposited on the circuit interface 43, and the LEDs 422 are arranged on the base plate 421.

In this preferred embodiment, the circuit interface 43 is a circuit board deposited within the light box 41, and comprises a power supplying circuit 431, a detecting circuit 432 and a switch circuit 433, wherein the power supplying circuit 431 is electrically connected to the lighting assembly 42, the detecting circuit 432 is electrically connected to the switch circuit 433 and the switch circuit 433 is electrically connected to the power storage unit 4.

The optical-to-electrical energy transformation unit 44 is deposited within the light box 41, and comprises a light-concentration assembly 441 and a optical-to-electrical energy transformation interface 442, wherein the light-concentration assembly comprises a plurality of light-concentration elements arranged in a predetermined array. In this preferred embodiment, the light-concentration elements are five light-concentration lenses 441a, 441b, 441c, 441d and 441e arranged in a linear array. The power storage unit 45 is electrically connected to the optical-to-electrical energy transformation interface 442 of the optical-to-electrical energy transformation interface 44 via the conductive wire 46. In the practice application, the conductive wire 46 can be a flexible printed circuit (FPC), the base plate 421 usually formed with heat-dissipating structures, and the base plate 421, the circuit interface 43 and the optical-to-electrical energy transformation interface 442 usually can be integrated to an one-part module.

When the light device 4 is electrically connected to the external power source 3, the power supplying circuit 431 and the detecting circuit also can be electrically connected to the external power source 3. Thus, the detecting circuit 432 can detect whether the external power source 3 supplies the specified power to the lighting assembly 42 via the power supplying circuit 431. At this moment, the external power source 3 can send the specified power to the lighting assembly 42, so that one of the LEDs 422 can projects an illumination light beam IL and two divergent light beam DL and DL', as shown in FIG. 5. The illumination light beam IL can be directly used to provide illumination to the external environment, while the divergent light beam DL cannot directly provide illumination to the external environment. The light concentration lenses 441a, 441b, 441c, 441d and 441e of the optical-to-electrical energy transformation interface 44 are located on a first projecting path of the divergent light beam DL, so as to respectively concentrate the divergent light beam to five concentrated light beams CL1, CL2, CL3, CL4 and CL5.

The optical-to-electrical energy interface 442 is located on a second projecting path, which concentrates five projecting paths of the five concentrated light beams CL1, CL2, CL3, CL4 and CL5, so as to senses the concentrated light beams CL1, CL2, CL3, CL4 and CL5 to generate an inductive power. The inductive power can be sent to the power storage unit 45 via the conductive wire 46, and the power storage unit 45 can collect the inductive power to store an emergent power.

When the detecting circuit detects that the external power source 3 interrupting supplying the specified power to the lighting assembly 42, the detecting circuit 432 can send a connecting signal S3 to the switch circuit 433 to make the switch circuit 433 electrically connect to the power supplying circuit 431. Hence, the power storage unit 45 can discharge the emergent power sending to the lighting assembly via the power supplying circuit 431, so as to drive the LEDs 422 of the lighting assembly 42 to go on projecting the illumination light beam, the divergent light beams DL and DL', wherein the divergent light beam DL can be re-used to make the optical-to-electrical energy interface 442 generate the inductive power, and the power storage unit 45 can collect the inductive power to charge the emergent power stored therein.

When the detecting circuit 432 detects that the external power source 3 returning supplying the specified power to the lighting assembly 42, the detecting circuit 432 can send an interruption signal S4 to the switch circuit 433 to make the switch circuit 433 interrupt electrically connecting to the power supplying circuit 431. Thus, it is able to drive the LEDs 422 of the lighting assembly 42 to go on projecting the illumination light beam, the divergent light beams DL and DL', wherein the divergent light beam DL can be re-used to make the optical-to-electrical energy interface 442 generate the inductive power, and the power storage unit 45 can collect the inductive power to charge the emergent power stored therein.

After reading above description, people skilled in related arts can easily realize that in the present invention, the light device 4 is applied to store the emergent power by using the divergent light beam DL, which is unable to directly provide illumination to the external environment. Therefore, it is unnecessary to use the solar energy system to charge the light device 4, and it can further ensure that the lighting assembly 42 still can provide stable illumination to the external environment whenever the external power source 3 cannot normally supply the specified power the light device.

Meanwhile, the light device 4 is applied to store the emergent power by using the divergent light beam DL, which is unable to directly provide illumination to the external environment. Therefore, the specified power supplied from the external power source 3 almost can be entirely supplied to the lighting assembly 42 to raise the utilization ratio of the power used to light.

Nevertheless, in the conventional light device, the divergent light beam, which cannot provide illumination to the external environment, may be either lost by diverging to the external environment or transformed to heat energy absorbed by the light device to increase the surface temperature. However, in the present invention, it is able to use the divergent light beam DL to generate the inductive power, so as to raise the utilization ratio of the light energy and reduce the surface temperature of the light device.

After reading above description, people skilled in the related arts can further realize that the concentration degree of the concentration light beams CL1, CL2, CL3, CL4 and CL5 projecting to the optical-to-electrical energy transformation interface 442 can directly influence the intensity of the inductive power, and the concentration degree of the concentration light beams CL1, CL2, CL3, CL4 and CL5 projecting to the optical-to-electrical energy transformation interface 442 is depended on the intensity of the divergent light DL, and the optical property, the arrangement direction and the arrangement angle of the light-concentration lenses 441a, 441b, 441c, 441d and 441e.

In FIG. 6, for improving the concentration degree of the concentration light beams CL1, CL2, CL3, CL4 and CL5 projecting to the optical-to-electrical energy transformation interface 442, any one of the light-concentration lenses 441a, 441b, 441c, 441d and 441e is arranged in the arrangement angle different from each other. In the practice application, the amount and the arrangement method of the light-concentration lenses can be adjusted to increase the concentration degree of the concentration light beams projecting to the optical-to-electrical energy transformation interface 442, so as to generate the inductive power with higher intensity.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A light device capable of performing light and power cogeneration projecting at least one illumination light beam and divergent light beam by a specified power supplied from an external power source, and comprising:

a lighting assembly for projecting the illumination light beam and at least one divergent light beam;

an optical-to-electrical energy transformation unit, comprising:

a light-concentration assembly located on a first projecting path of the divergent light beam for concentrating the divergent light beam to at least one concentrated light beam; and an optical-to-electrical energy transformation interface located on a second projecting path of the concentrated light beam for sensing the concentrated light beam to generate an inductive power;

a power storage unit electrically connected to the optical-to-electrical energy transformation interface for collecting the inductive power to store an emergent power; and a circuit interface including:

a power supplying circuit electrically connected to the external power source for sending the specified power to the power storage unit; and a switch circuit electrically connected to the power storage unit;

wherein when the external power source interrupts supplying the specified power to the lighting assembly, the switch circuit is electrically connected to the power supplying circuit so that the power storage unit discharges the emergent power via the power supplying circuit to drive the lighting assembly to go on projecting the illumination light beam and the divergent light beam.

2. The light device as claimed in claim 1, wherein the light-concentration assembly comprises a plurality of light-concentration elements for respectively concentrating the divergent light beam to a plurality of said concentrated light beams projecting to the optical-to-electrical energy transformation interface.

3. The light device as claimed in claim 2, wherein the light-concentration elements are arranged in a predetermined array.

4. The light device as claimed in claim 2, wherein the light-concentration elements are a plurality of light-concentration lenses.

5. The light device as claimed in claim 1, wherein the lighting assembly comprises a base plate and a plurality of light emitting diode (LED) arranged on the base plate.

6. The light device as claimed in claim 1, wherein the circuit interface further comprises a detecting circuit electrically connected to the external power source, so as to detect whether the specified power is sent to the lighting assembly.

7. The light device as claimed in claim 6, wherein the detecting circuit is electrically connected to the switch unit, and sends a connecting signal to the switch circuit to make the switch circuit electrically connect to the power supplying circuit when the detecting circuit detects the external power source interrupting supplying the specified power to the lighting assembly.

8. The light device as claimed in claim 7, wherein the detecting circuit sends an interruption signal to the switch circuit to make the switch circuit interrupt electrically connecting to the power supplying circuit when the detecting circuit detects the external power source returning supplying the specified power to the lighting assembly.

* * * * *